(12) United States Patent
Lambert et al.

(10) Patent No.: US 8,443,114 B2
(45) Date of Patent: May 14, 2013

(54) SYSTEM AND METHOD FOR MAPPING A LOGICAL DRIVE STATUS TO A PHYSICAL DRIVE STATUS FOR MULTIPLE STORAGE DRIVES HAVING DIFFERENT STORAGE TECHNOLOGIES WITHIN A SERVER

(75) Inventors: Timothy M. Lambert, Austin, TX (US); Indrani Paul, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 166 days.

(21) Appl. No.: 12/964,465

(22) Filed: Dec. 9, 2010

(65) Prior Publication Data

US 2012/0151097 A1 Jun. 14, 2012

(51) Int. Cl.
*G06F 3/00* (2006.01)
*G06F 13/12* (2006.01)
*G06F 13/38* (2006.01)

(52) U.S. Cl.
USPC .................................. 710/13; 710/15; 710/62

(58) Field of Classification Search .................... 710/13, 710/15, 62
See application file for complete search history.

(56) References Cited

U.S. PATENT DOCUMENTS

| | | |
|---|---|---|
| 2006/0095662 A1* | 5/2006 | Arnott ........................... 711/114 |
| 2007/0294582 A1 | 12/2007 | Rangarajan et al. |
| 2008/0059698 A1 | 3/2008 | Kabir et al. |
| 2009/0204758 A1 | 8/2009 | Luning |
| 2009/0210742 A1 | 8/2009 | Adarshappanavar et al. |
| 2011/0055471 A1* | 3/2011 | Thatcher et al. ............... 711/114 |

* cited by examiner

*Primary Examiner* — Idriss N Alrobaye
*Assistant Examiner* — Zachary K Huson
(74) *Attorney, Agent, or Firm* — Larson Newman, LLP

(57) ABSTRACT

An information handling system includes a backplane, a storage drive, and a board management controller. The board management controller is configured to discover a physical drive status of the drive from a storage enclosure processor, to receive a logical drive status of the drive, to read a backplane bay identification for the drive from a peripheral connector interface express extender or serial attached small computer system interface chipset logical drive number, and to construct a routing table for the drive to map the logical drive status with the physical drive status of the drive.

20 Claims, 4 Drawing Sheets

SYSTEM AND METHOD FOR MAPPING A LOGICAL DRIVE STATUS TO A PHYSICAL DRIVE STATUS FOR MULTIPLE STORAGE DRIVES HAVING DIFFERENT STORAGE TECHNOLOGIES WITHIN A SERVER

FIELD OF THE DISCLOSURE

This disclosure generally relates to information handling systems, and more particularly relates to a system and method for mapping a logical drive status to a physical drive status for multiple storage drives having different storage technologies within a server.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system, such as a server, can include modular hot-plug storage backplanes so that multiple storage drives with different storage technologies can be connected to the information handling system. The drives connected to the backplanes can be serial advanced technology attachment (SATA) drives, serial attached small computer system interface (SAS) drives, peripheral connector interface express (PCIe) solid state drives, or the like. The backplanes can be managed by an SAS/SATA chipset, software redundant array of independent disks (RAID) controllers, or the like. A board management controller of the information handling system can be a proxy between the managing device and the backplane processors to enable the routing of traffic between a host of the information handling system and the storage drive.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
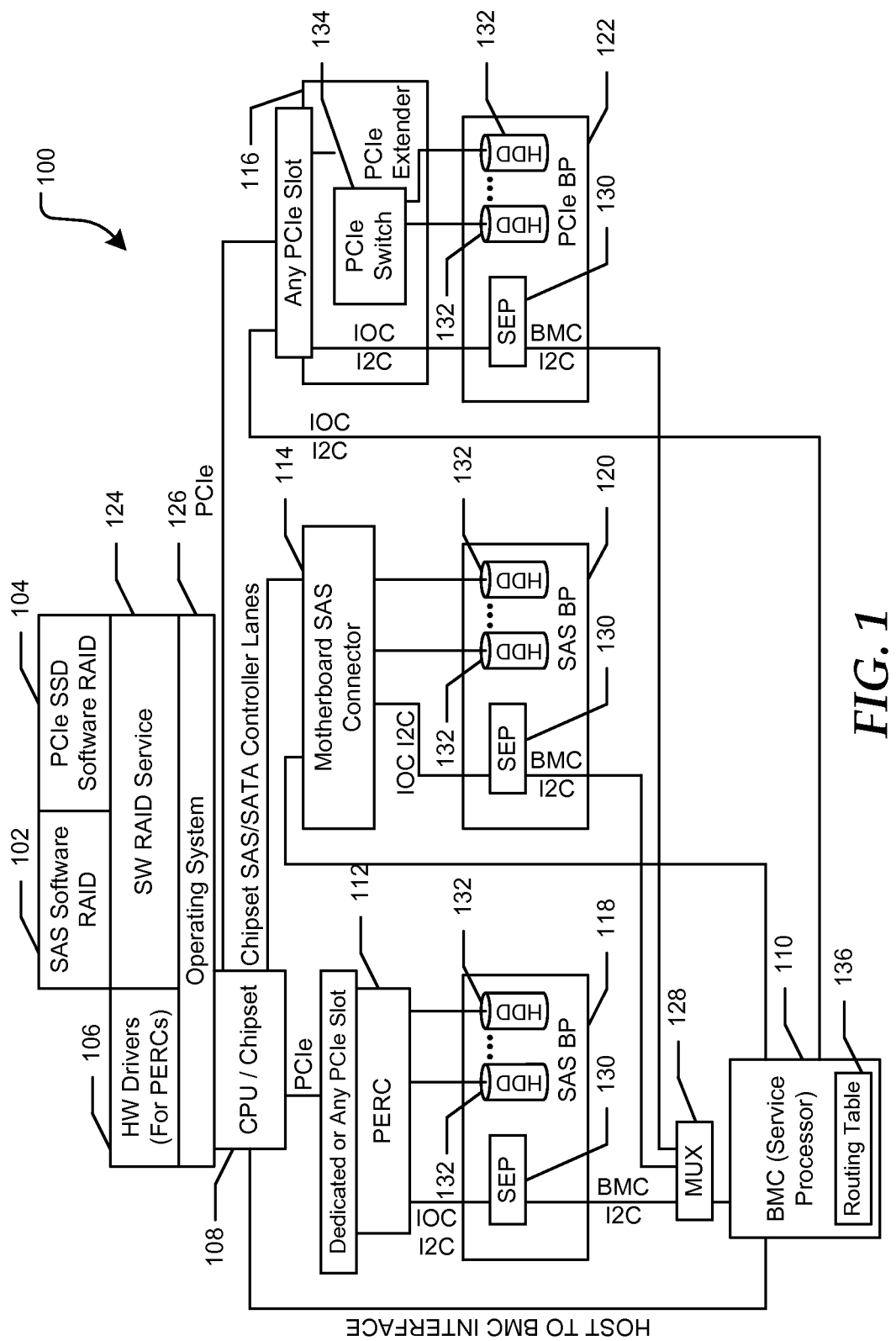
FIG. 1 is a block diagram of an information handling system.

FIG. 1 shows an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

In a preferred embodiment, the information handling system 100 can be a server. The server 100 includes a serial attached small computer system interface (SAS) software redundant array of independent disks (RAID) controller 102, a peripheral connector interface express (PCIe) solid state drive (SSD) software RAID controller 104, hardware drivers 106, a central processing unit or chipset 108, and a board management controller (BMC) 110. The server 100 also includes a power edge expandable RAID controller (PERC) 112, a motherboard SAS connector 114, a PCIe extender 116, SAS backplanes 118 and 120, a PCIe backplane 122, a software RAID service 124, and an operating system 126. Each of the backplanes 118, 120, and 122 include a storage enclosure processor (SEP) 130, and multiple hard disk drives (HDDs) 132. The PCIe extender 116 can be associated with a PCIe switch 134.

The SAS software RAID controller 102 and the PCIe SSD software RAID controller 104 are in communication with the chipset 108 via the software RAID service 124 and the operating system 126. The chipset 108 is in communication with the BMC 110, the PERC 112, the motherboard SAS connector 114, and with the PCIe switch 134. The BMC 110 is in communication with the motherboard SAS connector 114 and with the PCIe switch 134. The BMC 110 is also in communication with the SEPs 130 of each of the backplanes 118, 120, and 122 via a multiplexer 128. The PERC 112 is in communication with the SEP 130 and the HDDs 132 of the SAS backplane 118. The motherboard SAS connector 114 is in communication with the SEP 130 and the HDDs 132 of the SAS backplane 120. The PCIe switch 134 is in communication with the HDDs 132 of the PCIe backplane 122.

Upon a reset of the server 100, the BMC 110 can re-initialize the drive status of all HDDs 132 controlled by the SAS software RAID controller 102 or the PCIe SSD software RAID controller 104. The BMC 110 can communicate with each SEP 130 of the backplanes 118, 120, and 122 via the multiplexer 128 to discover slot locations for each HDD 132 in each of the backplanes. Each SEP 130 can determine the storage technology type for the associated backplane and the HDDs 132, a physical slot mapping for the HDDs, and cable validation for the HDDs in the associated backplane. The physical slot mapping can assign each HDD 132 in a backplane a physical slot number for that particular backplane, such as slot one in the SAS backplane 120. The cable validation in the SEP 130 can verify that the backplane is connected to a controller or chipset with a storage technology compatible with the HDDs 132 in the backplane. For example, the SEP 130 can verify that the PCIe backplane 122 is connected to the PCIe switch 134.

The BMC 110 can communicate with each SEP 130 to receive an indication of the type of the storage technology for the backplane 118, 120, or 122 and the HDDs 132, the physical slot mapping for the HDDs, and cable validation for the HDDs. The BMC 110 can also receive a physical drive status for each HDD 132 from the associated SEP 130. The physical drive status can include a drive slot, a drive state, a drive presence, and a bay identification for the HDD 132 as stored in the SEP 130. The backplane bay identification can be the physical address of the HDD 132 associated with the backplane bay. The BMC 110 can then determine whether each backplane 118, 120, and 122 is connected to the SAS software RAID controller 102 or to the PCIe SSD software RAID controller 104.

During a power on self-test (POST) of the server 100, a basis input output system can send a logical drive status for each of the HDDs 132 including the PCIe extender 116 or an SAS chipset logical drive number for the HDD to the BMC 110. The PCIe extender 116 can include bus, device, and function for the HDD 132, which can be a logical address for the HDD. The BMC 110 can also utilize the PCIe extender 116 of the HDD 132 to read a backplane bay identification for the HDD, and to determine into which PCIe slot of the PCIe backplane 122 the HDD is plugged. The software RAID service 124 correlates the PCIe extender 116 or SAS chipset logical drive number to either the SAS software RAID controller 102 or to the PCIe SSD software controller 104, and relays this information to the BMC 110. The BMC 110 can then utilize the information in the logical drive status and the information in the physical drive status of each of the HDDs 132 to construct a routing table 136 between a logical address and a physical address of the HDD.

When the routing table 136 has been completed, the BMC 110 can utilize the routing table during a read request for an HDD 132. During a read request for the drive state of one of the HDDs 132, the operating system 126 can send the logical drive status, including the drive slot or the logical address, of the HDD 132 to be read to the BMC 110. The BMC 110 can then determine the physical drive status of the HDD 132 from the routing table 136. The BMC 110 can communicate with the SEP 130 associated with the HDD 132 to receive the current physical drive status of the HDD from the SEP. The BMC 110 can then send information associated with the physical device status of the HDD 132, such as the drive state, to the SAS software RAID controller 102 or to the PCIe SSD software RAID controller 104 via the chipset 108, the operating system 126, and the software RAID service 124. For example, if the HDD 132 is within the SAS backplane 120, the BMC 110 can send the information in the physical drive status of the HDD to the SAS software RAID controller via the chipset 108, the operating system 126, and the software RAID service 124.

During a write to one of the HDDs 132, the software RAID service 124 can be notified of a logical drive status change associated with the HDD for the SAS software RAID controller 102 or the PCIe SSD software RAID controller 104. The logical drive status change can be a change in a drive state of an HDD 132 associated with a particular PCIe extender 116 or a particular SAS chipset logical drive number. The software RAID service 124 can then route the logical drive status along with the new drive state for the HDD 132 to the BMC 110. The BMC 110 can then route the new drive state to the SEP 130 associated with the proper backplane bay and physical drive slot based on an entry in the routing table 136 for the HDD 132. For example, if the write is for an HDD 132 in the PCIe backplane 122, the BMC 110 can send the new drive state for the associated physical drive slot to SEP 130 in the PCIe backplane, which in turn can store the new drive state of the HDD.

Figure 2:
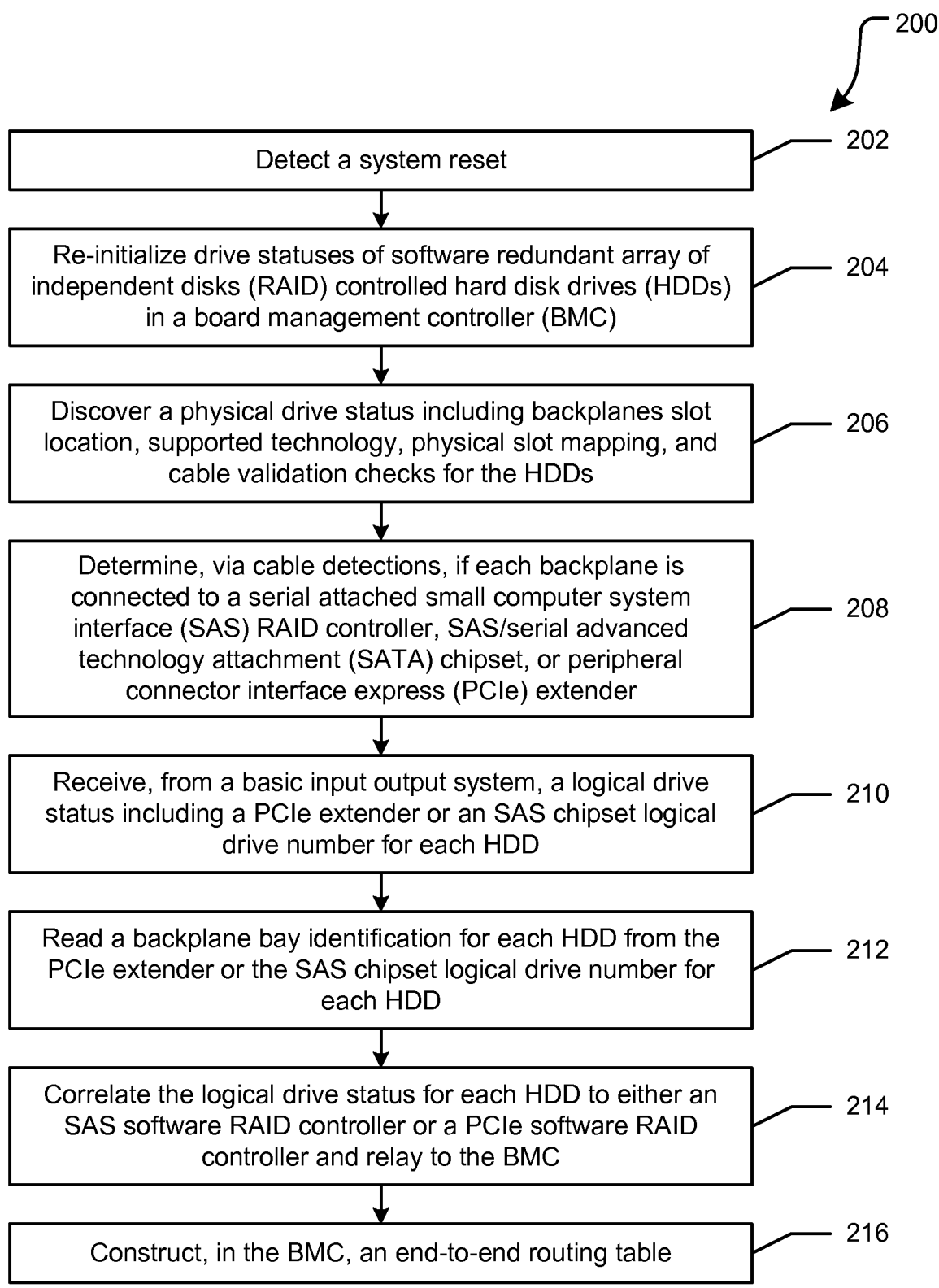
FIG. 2 is a flow diagram of a method for mapping a logical drive status to a physical drive status in a board management controller.

FIG. 2 shows a method 200 for mapping logical drives to physical drives in the BMC. At block 202, a system reset is detected. Drive statuses for software RAID controlled drives are re-initialized by the BMC at block 204. At block 206, a physical drive status including backplane slot locations, supported storage technologies, physical slot mapping, and cable validation checks for HDDs are discovered. Cable detections are utilized to determine whether backplanes are connected to an SAS RAID controller, an SAS/SATA chipset, a PCIe extender, or the like at block 208.

At block 210, a logical drive status including a PCIe extender or an SAS chipset logical drive number for each HDD is relayed to the BMC from the BIOS. The PCIe extender can include bus, device, and function for an HDD. A backplane bay identification, such as a physical location, is read for each HDD from the PCIe extender or SAS chipset logical drive number at block 212. The backplane bay identification can be utilized to determine the backplane associated with each HDD. The logical drive status is correlated to either an SAS software RAID controller or a PCIe SSD software RAID controller, and then relayed to the BMC at block 214. At block 216, a routing table is constructed in the BMC. The routing table can map the logical drive status to the physical drive status of each HDD connected to the server.

Figure 3:
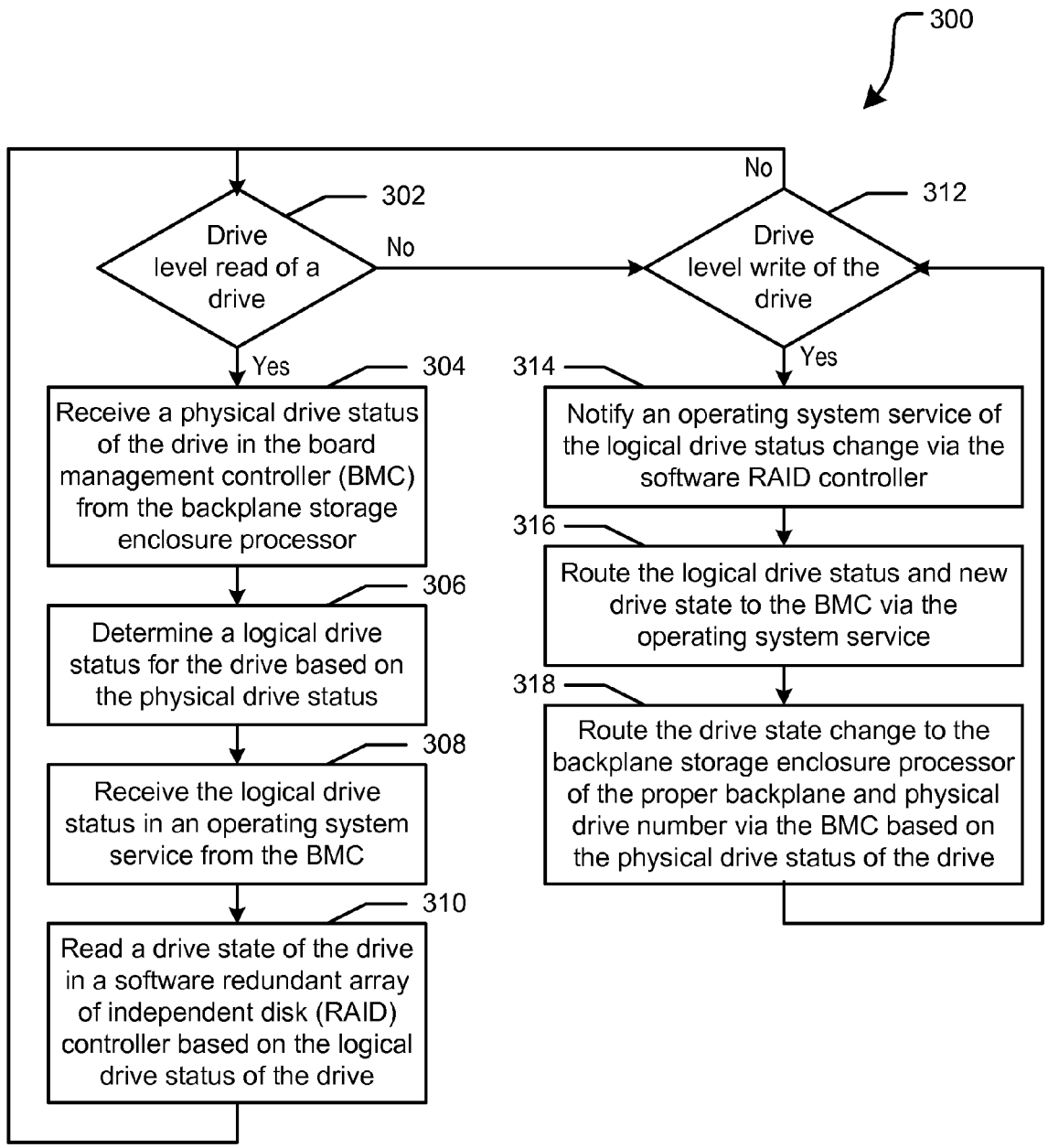
FIG. 3 is a flow diagram of a method for communicating between a host and a drive of the information handling system during read and write events.

FIG. 3 shows a method 300 for communicating between a host and a drive of the server during read and write events. At block 302, a determination is made whether a drive level read of a drive has been detected. If the drive level read has been detected, a physical drive status of the drive is received by the BMC from the backplane SEP associated with the drive at block 304. The physical drive status can include a physical drive slot, a drive state, a drive presence, a bay identification, and the like for the drive. At block 306, a logical drive status is determined for the drive based on the physical drive status. The logical drive status can be determined based on the routing table in the BMC. The logical drive status can include the bus, device, function, or chipset logical drive number for the drive. The logical drive status of the drive is received in the operating system service from the BMC at block 308. A drive state of the drive is read by a software RAID controller based on the logical drive status of the drive at block 310, and the flow repeats as stated above at block 302.

If the drive level read has not been detected, a determination is made whether a drive level write of the drive has been detected at block 312. If the drive level write has not been detected, the flow repeats as stated above at block 302. If the drive level write has been detected, the operating system service is notified of a logical drive status change via the software RAID associated with the drive at block 314. At block 316, the logical drive status and a new drive state for the drive is routed to the BMC from the operating system service. The drive state change is routed to the SEP associated with the proper backplane and physical drive number via the BMC based on the logical drive state from the operating system service at block 318, and the flow repeats as stated above at block 312.

Figure 4:
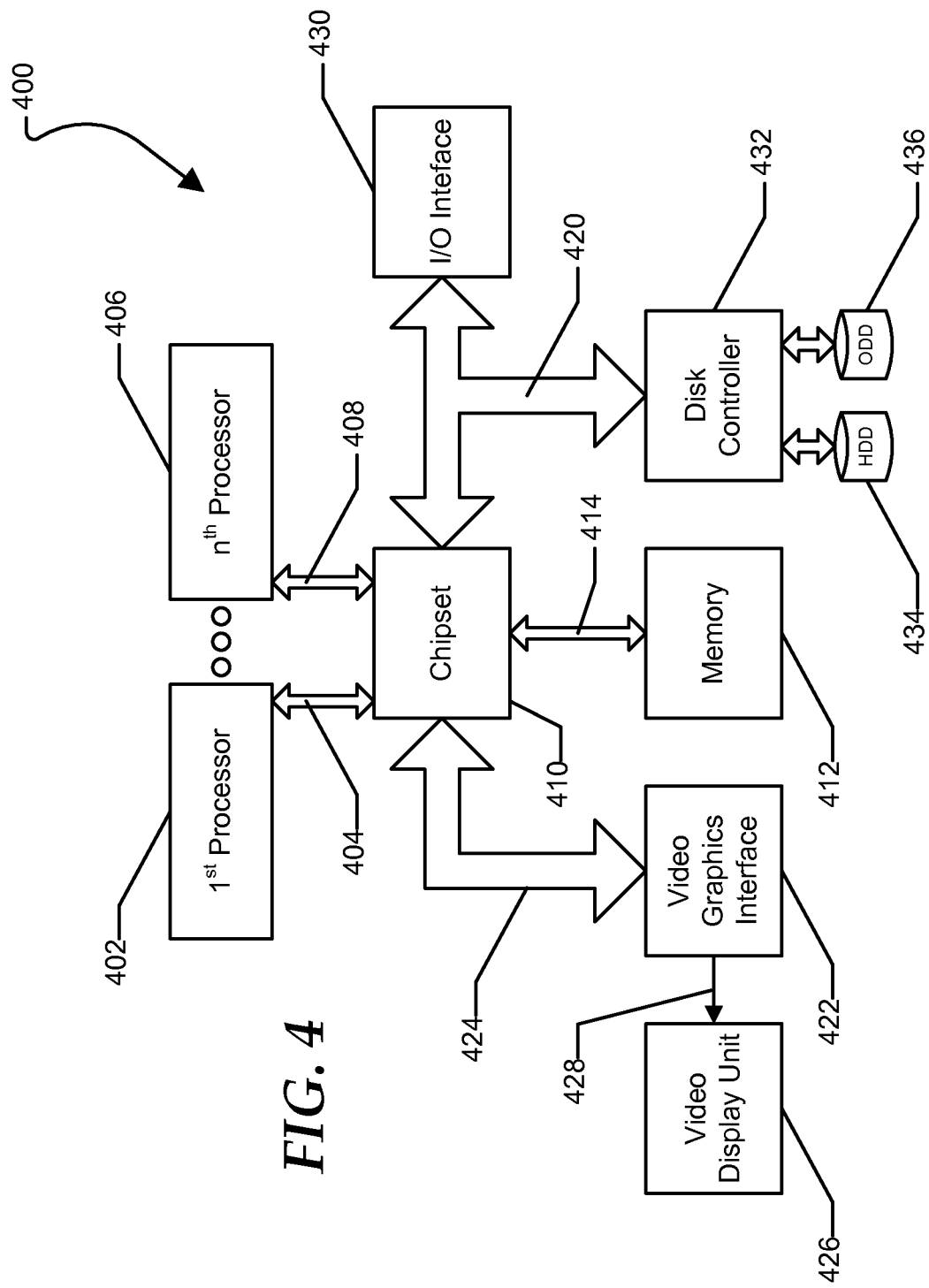
FIG. 4 is a block diagram of a general information handling system.

FIG. 4 illustrates a block diagram of a general information handling system, generally designated at 400. In one form, the information handling system 400 can be a computer system such as a server. As shown in FIG. 4, the information handling system 400 can include a first physical processor 402 coupled to a first host bus 404 and can further include additional processors generally designated as n$^{th}$ physical processor 406 coupled to a second host bus 408. The first physical processor 402 can be coupled to a chipset 410 via the first host bus 404. Further, the n$^{th}$ physical processor 406 can be coupled to the chipset 410 via the second host bus 408. The chipset 410 can support multiple processors and can allow for simultaneous processing of multiple processors and support the exchange of information within information handling system 400 during multiple processing operations.

According to one aspect, the chipset 410 can be referred to as a memory hub or a memory controller. For example, the chipset 410 can include an Accelerated Hub Architecture (AHA) that uses a dedicated bus to transfer data between first physical processor 402 and the n$^{th}$ physical processor 406. For example, the chipset 410, including an AHA enabled-chipset, can include a memory controller hub and an input/output (I/O) controller hub. As a memory controller hub, the chipset 410 can function to provide access to first physical processor 402 using first bus 404 and n$^{th}$ physical processor 406 using the second host bus 408. The chipset 410 can also provide a memory interface for accessing memory 412 using a memory bus 414. In a particular embodiment, the buses 404, 408, and 414 can be individual buses or part of the same bus. The chipset 410 can also provide bus control and can handle transfers between the buses 404, 408, and 414.

According to another aspect, the chipset 410 can be generally considered an application specific chipset that provides connectivity to various buses, and integrates other system functions. For example, the chipset 410 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 410. The chipset 410 can also be packaged as an application specific integrated circuit (ASIC).

The information handling system 400 can also include a video graphics interface 422 that can be coupled to the chipset 410 using a third host bus 424. In one form, the video graphics interface 422 can be an Accelerated Graphics Port (AGP) interface to display content within a video display unit 426. Other graphics interfaces may also be used. The video graphics interface 422 can provide a video display output 428 to the video display unit 426. The video display unit 426 can include one or more types of video displays such as a flat panel display (FPD) or other type of display device.

The information handling system 400 can also include an I/O interface 430 that can be connected via an I/O bus 420 to the chipset 410. The I/O interface 430 and I/O bus 420 can include industry standard buses or proprietary buses and respective interfaces or controllers. For example, the I/O bus 420 can also include a Peripheral Component Interconnect (PCI) bus or a high speed PCI-Express bus. In one embodiment, a PCI bus can be operated at approximately 66 MHz and a PCI-Express bus can be operated at approximately 428 MHz. PCI buses and PCI-Express buses can be provided to comply with industry standards for connecting and communicating between various PCI-enabled hardware devices. Other buses can also be provided in association with, or independent of, the I/O bus 420 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 410 can be a chipset employing a Northbridge/Southbridge chipset configuration (not illustrated). For example, a Northbridge portion of the chipset 410 can communicate with the first physical processor 402 and can control interaction with the memory 412, the I/O bus 420 that can be operable as a PCI bus, and activities for the video graphics interface 422. The Northbridge portion can also communicate with the first physical processor 402 using first bus 404 and the second bus 408 coupled to the n$^{th}$ physical processor 406. The chipset 410 can also include a Southbridge portion (not illustrated) of the chipset 410 and can handle I/O functions of the chipset 410. The Southbridge portion can manage the basic forms of I/O such as Universal Serial Bus (USB), serial I/O, audio outputs, Integrated Drive Electronics (IDE), and ISA I/O for the information handling system 400.

The information handling system 400 can further include a disk controller 432 coupled to the I/O bus 420, and connecting one or more internal disk drives such as a hard disk drive (HDD) 434 and an optical disk drive (ODD) 436 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a first backplane including a first storage enclosure processor;
    a second backplane including a second storage enclosure processor, wherein the second backplane has a different type of storage technology than the first backplane;
    a first storage drive connected to the first backplane;
    a second storage drive connected to the second backplane; and
    a board management controller in communication with the storage enclosure processor and with the storage drive, the board management controller configured to discover a first physical drive status of the first storage drive from the second storage enclosure processor and a second physical drive status of the second storage drive from the second storage enclosure processor, to receive a first logical drive status of the first storage drive and a second logical drive status of the second storage drive, to read a backplane bay identification for the storage drive from a peripheral connector interface express extender or serial attached small computer system interface chipset logical drive number, and to construct a routing table for the first storage drive to map the first logical drive status with the first physical drive status and for the second storage drive to map the second logical drive status with the second physical drive status.

2. The information handling system of claim 1 further comprising:
  a software redundant array of independent disks controller in communication with the board management controller, the software redundant array of independent disks controller configured to send the logical drive status including a peripheral connector interface express extender or a serial attached small computer system interface chipset logical drive number for the storage drive to the board management controller.

3. The information handling system of claim 1 wherein the board management controller is further configured to detect a drive level write for the storage drive, receive the logical drive status and a new drive state for the storage drive, and routing the drive state change to the storage enclosure processor associated with the backplane and a physical drive slot of the storage drive based on the logical drive state of the storage drive.

4. The information handling system of claim 1 wherein the board management controller is further configured to detect a drive level read of the storage drive, to receive the physical drive status of the storage drive from the storage enclosure processor of the backplane, to determine the logical drive status for the storage drive from the routing table based on the physical drive status, and to send the logical drive status of the storage drive to a software redundant array of independent disk controller.

5. The information handling system of claim 1 physical drive status includes a backplane slot location, a storage technology, a physical slot mapping, and a cable validation checks of the storage drive.

6. A method comprising:
  re-initializing a drive status of a drive of a software redundant array of independent disks controller;
  discovering a physical drive status including a backplane slot location, a storage technology, a physical slot mapping, and a cable validation check for the drive via a storage enclosure processor;
  determining that the software redundant array of independent disks controller connected to a backplane associated with the drive supports the storage technology of the drive, wherein the software redundant array of independent disks controller is connected to the backplane via a central processing unit;
  sending a logical drive status including a peripheral connector interface express extender or a serial attached small computer system interface chipset logical drive number for the drive to a board management controller;
  reading a backplane bay identification for the drive from the peripheral connector interface express extender or serial attached small computer system interface chipset logical drive number;
  correlating the logical drive status to the software redundant array of independent disks controller;
  constructing a routing table for the drive to map the logical drive status with the physical drive status of the drive;
  detecting a drive level write for the drive;
  notifying an operating system service of a new drive state for the drive based on the logical drive status via the software redundant array of independent disks controller;
  sending the logical drive status and the new drive state for the drive to the board management controller from the operating system; and
  routing the drive state change to the storage enclosure processor associated with the backplane and a physical drive slot based on the logical drive state of the drive.

7. The method of claim 6 further comprising:
  detecting a drive level read of the drive;
  receiving the physical drive status of the drive from the storage enclosure processor of the backplane;
  determining the logical drive status for the drive from the routing table based on the physical drive status;
  sending the logical drive status of the drive to the software redundant array of independent disks controller; and
  reading the drive state of the drive is read by the software redundant array of independent disks controller based on the logical drive status of the drive.

8. The method of claim 7 wherein the physical drive status include a physical drive slot, a drive state, a drive presence, a bay identification, or the like for the drive.

9. The method of claim 6 wherein the determining that the software redundant array of independent disks controller connected to the backplane associated with the drive supports the storage technology of the drive is performed via a cable detection.

10. The method of claim 6 wherein the software redundant array of independent disks controller is selected from a group consisting of a serial attached small computer system interface software redundant array of independent disks controller and a peripheral connector interface express solid state drive software redundant array of independent disks controller.

11. The method of claim 6 wherein the peripheral connector interface express extender includes bus, device, and function for the drive.

12. The method of claim 6 wherein the backplane bay identification can be utilized to determine the backplane associated with the drive.

13. A method comprising:
  discovering a physical drive status including a backplane slot location, a storage technology, a physical slot mapping, and a cable validation check for a drive via a storage enclosure processor;
  determining that a software redundant array of independent disks controller connected to a backplane associated with the drive supports the storage technology of the drive, wherein the software redundant array of independent disks controller is connected to the backplane via a central processing unit;
  sending a logical drive status including a peripheral connector interface express extender or a serial attached small computer system interface chipset logical drive number for the drive to a board management controller;
  reading a backplane bay identification for the drive from the peripheral connector interface express extender or serial attached small computer system interface chipset logical drive number;
  correlating the logical drive status to the software redundant array of independent disks controller; and
  constructing a routing table for the drive to map the logical drive status with the physical drive status of the drive.

14. The method of claim 13 further comprising:
detecting a drive level read of the drive;
receiving the physical drive status of the drive from a storage enclosure processor of the backplane;
determining the logical drive status for the drive from the routing table based on the physical drive status;
sending the logical drive status of the drive to the software redundant array of independent disks controller; and
reading the drive state of the drive is read by the software redundant array of independent disks controller based on the logical drive status of the drive.

15. The method of claim 14 wherein the physical drive status include a physical drive slot, a drive state, a drive presence, a bay identification, or the like for the drive.

16. The method of claim 13 further comprising:
detecting a drive level write for the drive;
notifying an operating system service of a new drive state for the drive based on the logical drive status via the software redundant array of independent disks controller;
sending the logical drive status and the new drive state for the drive to the board management controller from the operating system; and
routing the drive state change to the storage enclosure processor associated with the backplane and a physical drive slot based on the logical drive state of the drive.

17. The method of claim 13 wherein the determining that the software redundant array of independent disks controller connected to the backplane associated with the drive supports the storage technology of the drive is performed via a cable detection.

18. The method of claim 13 wherein the software redundant array of independent disks controller is selected from a group consisting of a serial attached small computer system interface software redundant array of independent disks controller and a peripheral connector interface express solid state drive software redundant array of independent disks controller.

19. The method of claim 13 wherein the peripheral connector interface express extender includes bus, device, and function for the drive.

20. The method of claim 13 wherein the backplane bay identification can be utilized to determine the backplane associated with the drive.

* * * * *